(12) United States Patent
Hori et al.

(10) Patent No.: US 7,883,817 B2
(45) Date of Patent: Feb. 8, 2011

(54) METHOD FOR PRODUCING GAS DIFFUSION ELECTRODE AND METHOD FOR PRODUCING POLYMER ELECTROLYTE FUEL CELL, AND GAS DIFFUSION ELECTRODE AND POLYMER ELECTROLYTE FUEL CELL

(75) Inventors: Yoshihiro Hori, Nara (JP); Mikiko Yoshimura, Tokyo (JP); Yoichiro Tsuji, Osaka (JP); Takeshi Yonamine, Osaka (JP); Masaki Yamauchi, Osaka (JP)

(73) Assignees: Panasonic Corporation, Osaka (JP); Asahi Glass Co., Ltd., Tokyo (JP)

( * ) Notice: Subject to any disclaimer, the term of this patent is extended or adjusted under 35 U.S.C. 154(b) by 1069 days.

(21) Appl. No.: 11/579,344

(22) PCT Filed: Jul. 5, 2005

(86) PCT No.: PCT/JP2005/012413
§ 371 (c)(1),
(2), (4) Date: Nov. 2, 2006

(87) PCT Pub. No.: WO2006/004120
PCT Pub. Date: Jan. 12, 2006

(65) Prior Publication Data
US 2008/0274387 A1    Nov. 6, 2008

(30) Foreign Application Priority Data
Jul. 6, 2004    (JP)    ............... 2004-198916

(51) Int. Cl.
*H01M 8/10* (2006.01)
*H01M 4/88* (2006.01)
*H01M 4/96* (2006.01)
*H01M 8/02* (2006.01)

(52) U.S. Cl. ............... 429/480; 29/623.1; 429/535; 502/101; 502/172

(58) Field of Classification Search ............... None
See application file for complete search history.

(56) References Cited

U.S. PATENT DOCUMENTS 6,040,838 A    3/2000    Webb et al.

(Continued)

FOREIGN PATENT DOCUMENTS

CN    1455963 A    11/2003

(Continued)

OTHER PUBLICATIONS

Chinese Office Action with English Translation issued in Chinese Patent Application No. CN 200580019372.8 dated on Mar. 14, 2008.

*Primary Examiner*—Dah-Wei Yuan
*Assistant Examiner*—Angela J. Martin
(74) *Attorney, Agent, or Firm*—McDermott Will & Emery LLP

(57) ABSTRACT

The present invention provides a gas diffusion electrode capable of sufficiently preventing not only degradation of MEA during storage but also degradation of initial characteristics and durability during the time period from production to initial use, and a polymer electrolyte fuel cell including the gas diffusion electrode. The gas diffusion electrode includes a catalyst layer in which $A_1$ representing a total mass of organic substance comprising alcohol, a partial oxide of the alcohol, a product of intramolecular dehydrogenation reaction of the alcohol, a product of intermolecular condensation reaction of the alcohol, a product of intermolecular condensation reaction between the alcohol and the partial oxide and a product of intermolecular condensation reaction of the partial oxide, $E_1$ representing a total mass of carbon powder and $G_1$ representing a total mass of cation exchange resin are controlled to satisfy $\{100 \times A_1/(E_1+G_1)\} \leq 0.05$.

11 Claims, 4 Drawing Sheets

U.S. PATENT DOCUMENTS

| | | | |
|---|---|---|---|
| 7,029,785 B2 | 4/2006 | Hatoh et al. | |
| 2003/0143454 A1 * | 7/2003 | Hatoh et al. | 429/44 |
| 2005/0288177 A1 | 12/2005 | Hatoh et al. | |

FOREIGN PATENT DOCUMENTS

| | | |
|---|---|---|
| JP | 03-208262 | 9/1991 |
| JP | 06-203848 | 7/1994 |
| JP | 06-251788 | 9/1994 |
| JP | 07-029576 | 1/1995 |
| JP | 10-507574 | 7/1998 |
| JP | 2002-093424 | 3/2002 |
| JP | 2003-045440 | 2/2003 |
| JP | 2003-272637 | 9/2003 |
| JP | 2003-282076 | 10/2003 |
| JP | 2003-346819 | 12/2003 |
| JP | 2004-185930 | 7/2004 |
| JP | 2004-185930 A * | 7/2004 |
| JP | 2005-190887 | 7/2005 |
| WO | WO 95/12864 | 5/1995 |
| WO | WO 01/99216 A1 | 12/2001 |

* cited by examiner

METHOD FOR PRODUCING GAS DIFFUSION ELECTRODE AND METHOD FOR PRODUCING POLYMER ELECTROLYTE FUEL CELL, AND GAS DIFFUSION ELECTRODE AND POLYMER ELECTROLYTE FUEL CELL

RELATED APPLICATION

This application is a national phase of PCT/JP2005/012413 filed Jul. 5, 2005, which claims priority from Japanese Application No. 2004-198916 filed Jul. 6, 2004, the disclosures of which applications are incorporated by reference herein. The benefit of the filing and priority dates of the International and Japanese Applications is respectfully requested.

TECHNICAL FIELD

The present invention relates to a polymer electrolyte fuel cell for use in portable power sources, power sources for portable devices and electric vehicles, and home cogeneration systems.

BACKGROUND ART

To obtain a polymer electrolyte fuel cell that generates electricity and heat simultaneously by electrochemically reacting a fuel gas and an oxidant gas, first, catalyst layers are formed on both surfaces of a polymer electrolyte membrane that selectively transports hydrogen ions using a mixture containing at least a carbon powder carrying an electrode catalyst (e.g., platinum metal catalyst) for accelerating an electrode reaction on an anode or a cathode, and a cation exchange resin (hydrogen ion conductive polymer electrolyte).

Then, on the outer surfaces of the catalyst layers are formed gas diffusion layers having both fuel gas permeability and electron conductivity. The catalyst layers are sometimes called gas diffusion electrodes. In some cases, the combination of a catalyst layer and a diffusion layer is called a gas diffusion electrode.

In order to prevent supplied fuel gas from leaking to the outside or to prevent the fuel gas and oxidant gas from mixing with each other, on the peripheries of the gas diffusion electrodes are placed gas sealants or gaskets, with the polymer electrolyte membrane between the gas diffusion electrodes. Such sealants or gaskets are combined with the gas diffusion electrodes and the polymer electrolyte membrane, forming a membrane electrode assembly (MEA). Alternatively, the combination of a polymer electrolyte membrane and the gas diffusion electrodes is called membrane electrode assembly (MEA).

On the outer surfaces of the MEA are disposed conductive separators for fixing adjacent MEAs to each other and electrically connecting the MEAs in series. On the surface of each separator to be in contact with the MEA is formed a gas channel for supplying a reaction gas to the electrode surface of the MEA and removing an electrode reaction product and excess gas to the outside of the MEA. The gas channel is usually formed by providing a groove on the separator surface, but it may be formed as a separate member.

Most polymer electrolyte fuel cells comprise a stack formed of a plurality of stacked unit cells, each unit cell comprising an MEA as described above and a pair of separators for sandwiching the MEA. Because heat is generated by the generation of power during operation, cooling water channels are formed between every one to three unit cells so as to maintain the cell temperature at a constant level. The generated thermal energy is utilized in the form of warm water or the like.

The gas diffusion electrodes and polymer electrolyte fuel cells as described above, however, had the following problem. Impurities such as organic substance entering into a fuel cell from the outside after its shutdown poison and degrade the catalyst in the MEA. As a result, the fuel cell cannot exert its original performance in subsequent operations, or the cell's durability decreases at an early stage of long-term power generation.

In view of this, for example, Patent Document 1 discloses a technique in which water is filled into the fuel or oxidant gas channel of a fuel cell before its shutdown and the fuel cell is preserved while the fuel or oxidant gas channel is filled with the water.

Patent Document 1: JP 6-251788 A

DISCLOSURE OF THE INVENTION

Problem to be Solved by the Invention

The technique disclosed by Patent Document 1, however, still has some improvements to be made to provide sufficient cell performance even in subsequent operations after shutdowns, and to sufficiently prevent the degradation of cell performance during operation and storage when the fuel cell is used for a long period of time.

Moreover, the gas diffusion electrodes and polymer electrolyte fuel cells have been plagued by problems such as degradation of initial characteristics that occurs not only during shutdown and storage but also during production and during the time period from production to purchase or initial use, and degradation of initial characteristics during storage after shutdown.

In view of the above, the present invention has been made. An object of the present invention is to provide a gas diffusion electrode and a polymer electrolyte fuel cell having excellent durability and capable of exerting their original performance from the initial stage (immediately after production) and sufficiently preventing the degradation of initial characteristics even when startup and shutdown are repeated over a long period of time.

It is a further object of the present invention is to provide a method for producing a gas diffusion electrode that provides the above-described gas diffusion electrode in an easy and reliable manner and a method for producing a polymer electrolyte fuel cell that provides the above-described polymer electrolyte fuel cell in an easy and reliable manner.

Means for Solving the Problem

As a result of extensive studies to achieve the objects, the present inventors found that, particularly when a polymer electrolyte fuel cell is stored or operated for a long period of time, a trace amount of organic substance that enters into the electrode(s) during storage after shutdown of the fuel cell is one of the major factors that degrade the electrode characteristic and cell characteristic. They also found that to sufficiently reduce the amount of organic substance which remains in the catalyst layer of the formed electrode(s) as well as the amount of organic substance that enters into the catalyst layer of the electrode(s) during long-term operation and storage are extremely effective in achieving the above objects. On the basis of these findings, the present invention has been accomplished.

More specifically, in order to solve the above problems, the present invention provides a method for producing a gas diffusion electrode comprising at least a catalyst layer including a carbon powder carrying an electrode catalyst and a cation exchange resin, the method comprising: a mixture preparation step for preparing a catalyst layer-forming mixture containing the carbon powder carrying an electrode catalyst, the cation exchange resin, and a liquid containing an alcohol capable of dissolving or dispersing the cation exchange resin and having a vapor pressure at 20° C. of 0.6 to 12.3 kPa; and a catalyst layer forming step for forming the catalyst layer on a support sheet using the mixture, characterized in that in the catalyst layer forming step, organic substance comprising at least one of the alcohol, a partial oxide of the alcohol, a product of intramolecular dehydrogenation reaction of the alcohol, a product of intermolecular condensation reaction of the alcohol, a product of intermolecular condensation reaction between the alcohol and the partial oxide, and a product of intermolecular condensation reaction of the partial oxide is removed, whereby a rate [mass %] of the organic substance which remains in the catalyst layer is adjusted to satisfy the following equation (1):

$$\{100 \times A_1/(E_1+G_1)\} \leq 0.05 \tag{1},$$

where $A_1$ represents a total mass of the organic substance, $E_1$ represents a total mass of the carbon powder and $G_1$ represents a total mass of the cation exchange resin.

As described above, in the catalyst layer forming step, the amount of the organic substance contained (remaining) in the electrode immediately after production is adjusted to satisfy the above equation (1) {that is, the value of the equation (1) is adjusted to be 0.05 or less}, whereby it is possible to produce a gas diffusion electrode in an easy and reliable manner which has excellent durability and is capable of exerting its original performance (electrode characteristics) from the initial stage (immediately after production) and sufficiently prevents the degradation of initial characteristics even when startup and shutdown are repeated over a long period of time. Furthermore, with the use of this gas diffusion electrode, it is possible to produce a polymer electrolyte fuel cell in an easy and reliable manner which has excellent durability and is capable of exerting its original performance (electrode characteristics) from the initial stage (immediately after production) and sufficiently prevents the degradation of initial characteristics even when startup and shutdown are repeated over a long period of time. Particularly, this production method provides a gas diffusion electrode and a polymer electrolyte fuel cell having excellent initial characteristics.

If the value of the equation (1): $\{100 \times A_1/(E_1+G_1)\}$ exceeds 0.05, the organic substance poisons the electrode catalyst, and therefore sufficient initial characteristics cannot be obtained from immediately after production. Moreover, the electrode characteristics will degrade largely during long-term operation and storage. Note that when determining the value of the equation (1): $\{100 \times A_1/(E_1+G_1)\}$, the values of $A_1$, $E_1$ and $G_1$ should be converted into the same unit.

In the mixture preparation step, if an alcohol having a vapor pressure at 20° C. of less than 0.6 kPa is used, because such alcohol is highly volatile, the resulting mixture will be difficult to handle, so that easy and uniform application of the mixture onto a specified target (e.g., polymer electrolyte membrane, gas diffusion layer, support material) cannot be achieved. Conversely, in the mixture preparation step, if an alcohol having a vapor pressure at 20° C. exceeding 12.3 kPa is used, because such alcohol is resistant to volatility, the resulting mixture will be difficult to handle, and a longer drying time is required after the application of the mixture onto a specified target (e.g., polymer electrolyte membrane, gas diffusion layer, support material). Further, in this case, the drying temperature should be increased. The increase in drying temperature can degrade the cation exchange resin in the catalyst layer or the polymer electrolyte membrane. Moreover, when the mixture is applied onto a polymer electrolyte membrane, the polymer electrolyte membrane can degrade.

The term "capable of dissolving or dispersing the cation exchange resin" used herein includes a condition in which a part of cation exchange resin is dissolved and another part is not dissolved but dispersed.

The present invention further provides a gas diffusion electrode comprising at least a catalyst layer including a carbon powder carrying an electrode catalyst and a cation exchange resin, characterized in that the catalyst layer is formed with a mixture containing the carbon powder carrying an electrode catalyst, the cation exchange resin, and a liquid containing an alcohol capable of dissolving or dispersing the cation exchange resin and having a vapor pressure at 20° C. of 0.6 to 12.3 kPa, and a rate [mass %] of organic substance which remains in the catalyst layer satisfies the following equation (1), the organic substance comprising at least one of the alcohol, a partial oxide of the alcohol, a product of intramolecular dehydrogenation reaction of the alcohol, a product of intermolecular condensation reaction of the alcohol, a product of intermolecular condensation reaction between the alcohol and the partial oxide, and a product of intermolecular condensation reaction of the partial oxide:

$$\{100 \times A_1/(E_1+G_1)\} \leq 0.05 \tag{1},$$

where $A_1$ represents a total mass of the organic substance, $E_1$ represents a total mass of the carbon powder and $G_1$ represents a total mass of the cation exchange resin.

Because the gas diffusion electrode of the present invention described above comprises a catalyst layer that satisfies the equation (1) given in the method for producing a gas diffusion electrode of the present invention described previously, the gas diffusion electrode of the present invention has excellent durability, and can exert its original performance (electrode characteristics) from the initial stage (immediately after the production) and sufficiently prevent the degradation of initial characteristics even when startup and shutdown are repeated over a long period of time. This gas diffusion electrode of the present invention is preferably produced by the method for producing a gas diffusion electrode of the present invention described previously.

The present invention further provides a method for producing a polymer electrolyte fuel cell comprising at least a membrane electrode assembly including a cathode having a catalyst layer containing an electrode catalyst and a cation exchange resin, an anode having a catalyst layer containing an electrode catalyst and a cation exchange resin, and a polymer electrolyte membrane disposed between the cathode and the anode, the method comprising: a mixture preparation step for preparing a catalyst layer-forming mixture containing the electrode catalyst, the cation exchange resin, and a liquid containing an alcohol capable of dissolving or dispersing the cation exchange resin and having a vapor pressure at 20° C. of 0.6 to 12.3 kPa; and a membrane electrode assembly forming step for forming at least one of the two catalyst layers of the membrane electrode assembly on a membrane having a thickness of 20 to 50 and serving as the polymer electrolyte membrane by using the mixture so as to obtain the membrane electrode assembly having the at least one catalyst layer whose amount of electrode catalyst is adjusted to 0.1 to 2.0 mg/cm², characterized in that, in the membrane electrode assembly forming step, organic substance comprising at least one of the alcohol, a partial oxide of the alcohol, a product of intramolecular dehydrogenation reaction of the alcohol, a product of intermolecular condensation reaction of the alcohol, a product of intermolecular condensation reaction between the alcohol and the partial oxide, and a product of intermolecular condensation reaction of the partial oxide is removed, whereby a rate [mass %] of the organic substance which remains in the catalyst layer is adjusted to satisfy the following equation (2):

$$\{100 \times A_2/(E_2+G_2)\} \leq 0.02 \quad (2),$$

where $A_2$ represents a mass of the organic substance per unit area of the membrane electrode assembly, $E_2$ represents a mass of the catalyst layer per unit area of the membrane electrode assembly and $G_1$ represents a mass of the polymer electrolyte membrane per unit area of the membrane electrode assembly.

As described above, in the membrane electrode assembly forming step, the amount of the organic substance contained (remaining) in the electrode immediately after production is adjusted to satisfy the above equation (2) {that is, the value of the equation (2) is adjusted to be 0.02 or less}, whereby it is possible to produce a polymer electrolyte fuel cell in an easy and reliable manner which has excellent durability and is capable of exerting its original performance (electrode characteristics) from the initial stage (immediately after production) and sufficiently prevents the degradation of initial characteristics even when startup and shutdown are repeated over a long period of time. Particularly, in the case of this production method, a polymer electrolyte fuel cell having excellent initial characteristics can be obtained. According to this production method, it is possible to obtain a polymer electrolyte fuel cell in which the amount of the organic substance which remains in the electrode is reduced to a level that does not cause degradation of characteristics even when the amount is based on not the gas diffusion electrode but on the membrane electrode assembly.

If the value of the equation (2): $\{100 \times A_2/(E_2+G_2)\}$ exceeds 0.02, the organic substance poisons the electrode catalyst, and therefore sufficient initial characteristics cannot be obtained from immediately after production. Moreover, the electrode characteristics will degrade largely during long-term operation and storage. The reason why an alcohol having a vapor pressure at 20° C. of 0.6 to 12.3 kPa is used in the mixture preparation step is the same as the reason described in the mixture preparation step of the method for producing a gas diffusion electrode of the present invention given previously.

Even if the equation (2) is satisfied, when any one of the following conditions is met, the effect of the present invention cannot be obtained, and the production method cannot have sufficient reliability: when the polymer electrolyte membrane has a thickness of 20 μm or less; when the polymer electrolyte membrane has a thickness exceeding 50 μm; when the amount of electrode catalyst of at least one of two catalyst layers is less than 0.1 mg/cm²; and when the amount of electrode catalyst of at least one of two catalyst layers exceeds 2.0 mg/cm². From the viewpoint of ensuring the above-described effect of the present invention, preferably, two catalyst layers of the membrane electrode assembly each independently have a thickness of 3 to 50 μm.

$A_2$ representing "a mass of the organic substance per unit area of the membrane electrode assembly" in the equation refers to a value determined as follows. Specifically, a cylindrical or prismatic piece is obtained by punching out a center portion of the membrane electrode assembly such that the central axis of the obtained piece is substantially parallel to the normal line of the main surface of the polymer electrolyte membrane. Subsequently, a total mass w1 of the organic substance contained in the membrane electrode assembly of the obtained piece and a base area of the obtained piece s1 (apparent geometric area without considering the surface roughness factor) are measured. Then, $A_2$ is calculated using the calculation equation: $A_2=\{(w1)/(s1)\}$.

$E_2$ representing "a mass of the catalyst layer per unit area of the membrane electrode assembly" in the equation refers to a value determined as follows. Specifically, $E_2$ is determined using the same piece of the membrane electrode assembly as described for that used to determine $A_2$ above, or a piece of the membrane electrode assembly having the same volume and shape as that used to determine $A_2$ (a piece obtained by punching out the membrane electrode assembly used to determine $A_2$). First, a mass w2 of the two catalyst layers contained in the piece and s1 described above are measured. Then, $E_2$ is calculated using the calculation equation: $E_2=\{(w2)/(s1)\}$.

$G_2$ representing "a mass of the polymer electrolyte membrane per unit area of the membrane electrode assembly" in the equation refers to a value determined as follows. Specifically, $G_2$ is determined using the same piece of the membrane electrode assembly as described for that used to determine $A_2$ above, or a piece of the membrane electrode assembly having the same volume and shape as that used to determine $A_2$ (a piece obtained by punching out the membrane electrode assembly used to determine $A_2$). First, a mass w3 of the polymer electrolyte membrane contained in the piece and s1 described above are measured. Then, $G_2$ is calculated using the calculation equation: $E_2=\{(w3)/(s1)\}$.

Note that when calculating the value of the equation (2): $\{100 \times A_2/(E_2+G_2)\}$, the values of $A_2$, $E_2$ and $G_2$ should be converted into the same unit.

The present invention further provides a polymer electrolyte fuel cell comprising at least a membrane electrode assembly including a cathode having a catalyst layer containing an electrode catalyst and a cation exchange resin, an anode having a catalyst layer containing an electrode catalyst and a cation exchange resin, and a polymer electrolyte membrane disposed between the cathode and the anode, characterized in that the polymer electrolyte membrane has a thickness of 20 to 50 μm, the two catalyst layers of the membrane electrode assembly contain the electrode catalyst in an amount of 0.1 to 2.0 mg/cm², at least one of the two catalyst layers of the membrane electrode assembly is formed with a mixture comprising the electrode catalyst, the cation exchange resin, and a liquid containing an alcohol capable of dissolving or dispersing the cation exchange resin and having a vapor pressure at 20° C. of 0.6 to 12.3 kPa, a rate [mass %] of organic substance which remains in at least one catalyst layer satisfies the following equation (2), the organic substance comprising at least one of the alcohol, a partial oxide of the alcohol, a product of intramolecular dehydrogenation reaction of the alcohol, a product of intermolecular condensation reaction of the alcohol, a product of intermolecular condensation reaction between the alcohol and the partial oxide, and a product of intermolecular condensation reaction of the partial oxide: $\{100 \times A_2/(E_2+G_2)\} \leq 0.02 \ldots (2)$, where $A_2$ represents a mass of the organic substance per unit area of the membrane electrode assembly, $E_2$ represents a mass of the catalyst layer per unit area of the membrane electrode assembly and $G_1$ represents a mass of the polymer electrolyte membrane per unit area of the membrane electrode assembly.

Because the polymer electrolyte fuel cell of the present invention described above comprises a catalyst layer that satisfies the equation (2) given in the method for producing a polymer electrolyte fuel cell of the present invention described previously, the polymer electrolyte fuel cell of the present invention has excellent durability, and can exert its original performance (electrode characteristics) from the initial stage (immediately after the production) and sufficiently prevent the degradation of initial characteristics even when startup and shutdown are repeated over a long period of time.

This polymer electrolyte fuel cell of the present invention is preferably produced by the method for producing a gas diffusion electrode of the present invention or the method for producing a polymer electrolyte fuel cell of the present invention described previously. In other words, the polymer electrolyte fuel cell of the present invention is preferably produced by satisfying at least one of the equation (1) given in the catalyst layer forming step and the equation (2) given in the membrane electrode assembly forming step. More specifically, the polymer electrolyte fuel cell of the present invention is preferably produced by, based on feedback from experimental data or the like, adjusting the conditions for each procedure (the composition of the mixture, the heat treatment temperature, the gas composition of the vapor phase for use in the heat treatment) in the actual production process to satisfy at least one of the equation (1) and the equation (2).

Effect of the Invention

According to the method for producing a gas diffusion electrode of the present invention, it is possible to sufficiently remove organic substance which enters into the electrode during the production process as well as organic substance which enters into the electrode during storage after shutdown. It is therefore possible to provide a gas diffusion electrode and a polymer electrolyte fuel cell in an easy and reliable manner which have excellent durability and are capable of exerting the original performance (electrode characteristics) from the initial stage (immediately after production) and sufficiently prevent the degradation of initial characteristics even when startup and shutdown are repeated over a long period of time.

Similar to the method for producing a gas diffusion electrode described above, the method for producing a polymer electrolyte fuel cell of the present invention also removes the organic substance which enters into the electrode(s). Accordingly, it is possible to provide a polymer electrolyte fuel cell in an easy and reliable manner which has excellent durability and is capable of exerting the original performance (electrode characteristics) from the initial stage (immediately after production) and sufficiently prevents the degradation of initial characteristics even when startup and shutdown are repeated over a long period of time.

Further, according to the present invention, it is possible to provide a gas diffusion electrode having excellent durability and is capable of exerting the original performance (electrode characteristics) from the initial stage (immediately after production) and sufficiently prevents the degradation of initial characteristics even when startup and shutdown are repeated over a long period of time, which is preferably produced by the method for producing a gas diffusion electrode of the present invention described earlier.

Furthermore, according to the present invention, it is possible to provide a polymer electrolyte fuel cell having excellent durability and is capable of exerting the original performance (electrode characteristics) from the initial stage (immediately after production) and sufficiently prevents the degradation of initial characteristics even when startup and shutdown are repeated over a long period of time, which is preferably produced by the method for producing a gas diffusion electrode of the present invention or the method for producing a polymer electrolyte fuel cell of the present invention described earlier.

BRIEF DESCRIPTION OF THE INVENTION OF DRAWINGS

BEST MODE FOR CARRYING OUT THE INVENTION

Figure 1:
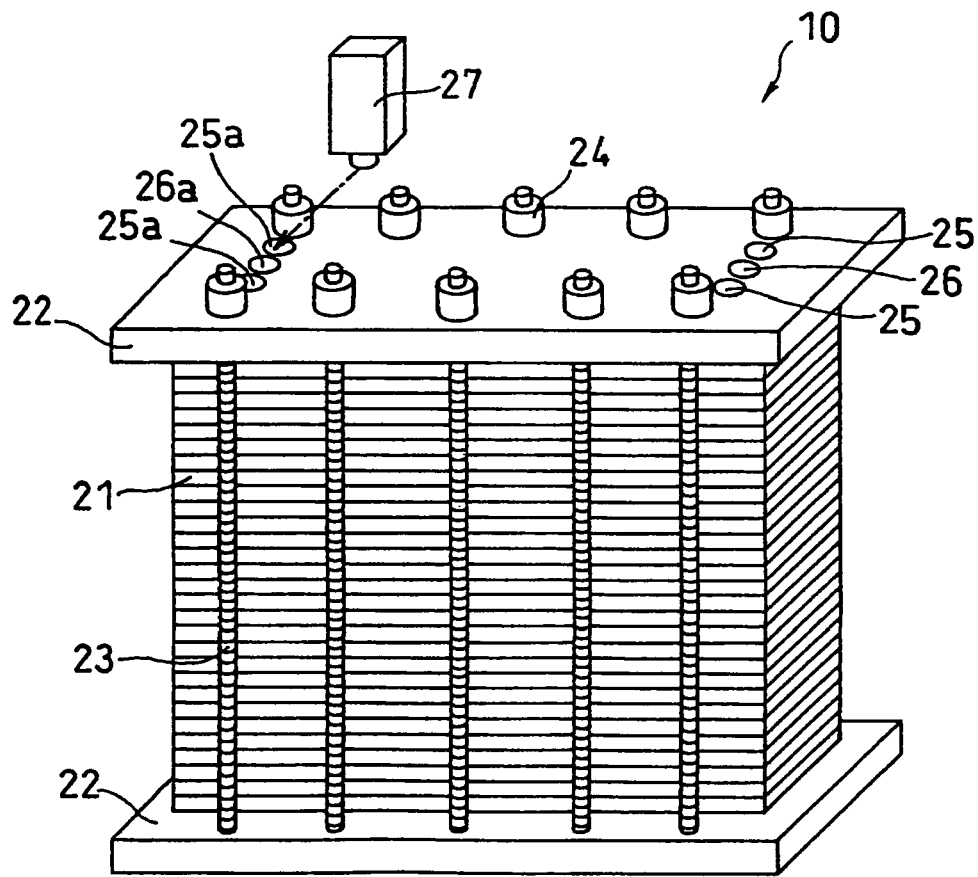
FIG. 1 is a perspective view of a polymer electrolyte fuel cell (stack) according to a preferred embodiment of the present invention.

Preferred embodiments of the present invention will be described below in further detail with reference to the accompanying drawings. It should be understood that the same reference numerals are given to the same or corresponding parts and some redundant descriptions are omitted.

Figure 2:
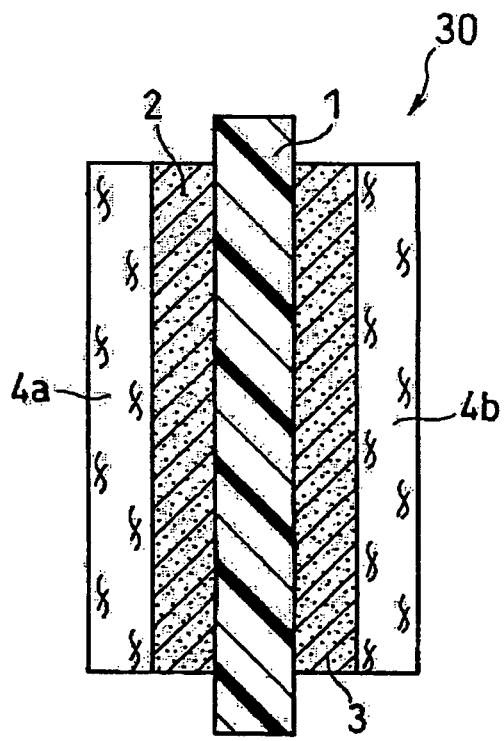
FIG. 2 is a cross-sectional view of a membrane electrode assembly for use in the polymer electrolyte fuel cell 10 shown in FIG. 1 showing a basic structure thereof.

FIG. 1 is a perspective view of a polymer electrolyte fuel cell (stack) according to a preferred embodiment of the present invention. FIG. 2 is a cross-sectional view of a membrane electrode assembly for use in the polymer electrolyte fuel cell 10 shown in FIG. 1 showing a basic structure thereof. A membrane electrode assembly 30 shown in FIG. 2 has gas diffusion electrodes according to a preferred embodiment of the present invention. A polymer electrolyte fuel cell 10 shown in FIG. 1 is preferably produced by the method for producing a gas diffusion electrode of the present invention or the method for producing a polymer electrolyte fuel cell of the present invention.

As shown in FIG. 2, the membrane electrode assembly 30 consists mainly of a polymer electrolyte membrane 1, an anode catalyst layer 2 and a cathode catalyst layer 3 attached to both surfaces of the polymer electrolyte membrane 1, an anode gas diffusion layer 4a and a cathode gas diffusion layer 4b attached to the anode and cathode catalyst layers, respectively, and sealants (not shown). When producing the polymer electrolyte fuel cell 10, separators (not shown) having a groove serving as a gas channel (not shown) and a groove serving as a cooling water channel (not shown) formed therein are disposed on the outer surfaces of the membrane electrode assembly 30.

As shown in FIG. 1, the polymer electrolyte fuel cell 10 consists mainly of a stack 21 comprising a plurality of laminates, each laminate comprising the membrane electrode assembly 30 and the separators, a pair of end plates 22 for clamping the stack 21 disposed on both surfaces of the stack 21, clamping rods 23 for clamping the two end plates 22, and spring screws 24. In each of the two end plates 22, there are formed gas inlets 25 for supplying reaction gas to the gas channels in the stack 21, gas outlets 25a for exhausting exhaust gas from the stack 21 to the outside of the stack 21, a cooling water inlet 26 for supplying cooling water to the cooling water channels in the stack 21, and a cooling water outlet 26a for exhausting exhaust cooling water from the stack 21 to the outside of the stack 21.

As the fuel, for example, a hydrogen gas obtained by reforming methanol, natural gas or the like is supplied through the gas channel of the anode. And, an oxidant gas such as air or oxygen gas is supplied through the gas channel of the cathode.

The polymer electrolyte membrane 1 has the function to selectively transport protons produced in the anode catalyst layer 2 to the cathode catalyst layer 3 along a thickness direction of the membrane. The polymer electrolyte membrane 1 also functions as a barrier for preventing the hydrogen supplied to the anode and the oxygen supplied to the cathode from mixing with each other.

The gas diffusion electrode produced according to the production method of the present invention may comprise (I) only a catalyst layer, or (II) a catalyst layer formed on a gas diffusion layer, that is, a combination of a gas diffusion layer and a catalyst layer.

In the case of (I), only a catalyst layer obtained by peeling it off from a support sheet may be produced as a product (gas diffusion electrode), or a catalyst layer formed on a support sheet from which the catalyst layer can be peeled off may be produced as a product. As will be described later, the support sheet can be a sheet or layer made of a synthetic resin insoluble in the catalyst layer-forming mixture, a laminate film comprising laminated layers made of metal, a metallic sheet, a sheet made of ceramics, a sheet made of an organic-inorganic composite material, or a polymer electrolyte membrane.

In the case of (II), one or more additional layer(s) such as a water repellent layer may be disposed between the gas diffusion layer and the catalyst layer. Further, a catalyst layer having a gas diffusion layer on one surface thereof and a support sheet attached to the other surface thereof from which the support sheet can be peeled off may be produced as a product.

The following describes in further detail the mixture preparation step and the catalyst layer forming step (membrane electrode assembly forming step), as well as the organic substance removing step performed in the catalyst layer forming step of the method for producing a gas diffusion electrode of the present invention and the method for producing a polymer electrolyte fuel cell of the present invention.

(a) Mixture preparation Step

In the present invention, first, in the mixture preparation step, a catalyst layer-forming mixture is prepared. This mixture comprises at least an electrode catalyst (powder), a cation exchange resin, and a liquid containing an alcohol capable of dissolving or dispersing the cation exchange resin and having a vapor pressure at 20° C. of 0.6 to 12.3 kPa.

The mixture can be used to form either anode catalyst layer or cathode catalyst layer. Particularly, it is preferred to use this mixture to form both anode catalyst layer and cathode catalyst layer.

As the cation exchange resin contained in the mixture, preferred is a resin having a cation exchange group such as sulfonic acid group, carboxylic acid group, phosphonic acid group or sulfonimide group. From the viewpoint of hydrogen ion conductivity, a cation exchange resin having a sulfonic acid group is particularly preferred as the cation exchange resin.

The cation exchange resin having a sulfonic acid group preferably has an ion exchange capacity of 0.5 to 1.5 meq/g dry resin. A cation exchange resin having an ion exchange capacity of not less than 0.5 meq/g dry resin is preferred because the resistance value of the resulting catalyst layer is less likely to increase during power generation. A cation exchange resin having an ion exchange capacity of not greater than 1.5 meq/g dry resin is also preferred because the moisture content of the resulting catalyst layer does not increase so that the catalyst layer will not swell easily and the pores will not be filled. The ion exchange capacity is particularly preferably 0.8 to 1.2 meq/g dry resin.

The cation exchange resin preferably comprises a copolymer containing a polymerization unit based on a perfluorovinyl compound represented by $CF_2=CF-(OCF_2CFX)_m-O_p-(CF_2)_n-SO_3H$ (where m is an integer from 0 to 3, n is an integer from 1 to 12, p is 0 or 1, and X is a fluorine atom or trifluoromethyl group) and a polymerization unit based on tetrafluoroethylene.

Preferred examples of the fluorovinyl compound include compounds represented by the following formulas (3) to (5). In the formulas, q is an integer from 1 to 8, r is an integer from 1 to 8, and t is an integer from 1 to 3.

$$CF_2=CFO(CF_2)_q-SO_3Hd \quad (3)$$

$$CF_2=CFOCF_2CF(CF_3)O(CF_2)_r-SO_3H \quad (4)$$

$$CF_2=CF(OCF_2CF(CF_3))_tO(CF_2)_2-SO_3H \quad (5)$$

Specific examples of the cation exchange resin include Nafion manufactured by Aldrich Corporation and Flemion manufactured by Asahi Glass Co. Ltd. As a constituent material of the polymer electrolyte membrane, the above-described cation exchange resin can be used.

As the dispersing medium of the mixture, a liquid containing an alcohol capable of dissolving or dispersing the cation exchange resin and having a vapor pressure at 20° C. of 0.6 to 12.3 kPa is used. The alcohol having a vapor pressure at 20° C. of 0.6 to 12.3 kPa has the advantage of being easily removed from the conductive porous material (e.g., carbon) that forms the catalyst layer so that it is unlikely to remain in the catalyst layer as a residue.

The alcohol preferably contains 1 to 5 carbon atoms and at least one OH group in the molecule. Specific examples include ethanol, n-propanol, isopropanol, n-butanol, isobutanol, n-pentanol, ethylene glycol, pentafluoroethanol and heptafluoroethanol. These alcohols may be used singly or in any combination of two or more. A straight chain alcohol having one OH group in the molecule is particularly preferred, namely, ethanol. Such alcohol includes alcohols having an ether bond such as ethylene glycol monomethylether.

The "liquid" containing an alcohol having a vapor pressure at 20° C. of 0.6 to 12.3 kPa may optionally contain a solvent other than the alcohol. Examples of other solvent include water and acetone. The solvent and the alcohol can be mixed at a ratio of 10:1 to 1:10. From the viewpoint of ensuring the prevention of oxidative reaction (combustion reaction) of the alcohol on the electrode catalyst, a liquid containing 50 mass % or more of water is particularly preferably used as the liquid.

The electrode catalyst of the present invention is carried onto a carbon powder before use. The electrode catalyst comprises a metal particle. As the metal particle, various metals can be used without any specific limitation. Preferred is, for example, at least one selected from the group consisting of platinum, gold, silver, ruthenium, rhodium, palladium, osmium, iridium, chromium, iron, titanium, manganese, cobalt, nickel, molybdenum, tungsten, aluminum, silicon, zinc and tin. Among them, preferred is an alloy comprising platinum, and more preferred is an alloy comprising platinum and ruthenium because it stabilizes the activity of the catalyst.

The carbon powder preferably has a specific surface area of 50 to 1500 $m^2/g$. A specific surface area of not less than 50 $m^2/g$ is preferred because the electrode catalyst-carrying ratio can be easily increased and the output characteristics of the resulting catalyst layer will not decrease. A specific surface area of not greater than 1500 $m^2/g$ is also preferred because the pores will not be too small and the electrode catalyst can be easily covered with the cation exchange resin, and the output characteristics of the resulting catalyst layer do not decrease. The specific surface area is particularly preferably 200 to 900 $m^2/g$.

The particles of the electrode catalyst preferably have an average particle size of 0.05 to 5 µm. An average particle size of not less than 0.05 µm is preferred because the resulting catalyst layer will not be too dense and the permeability of produced water in the anode or cathode is not impaired. An average particle size of not greater than 5 µm is also preferred because it does not prevent the cation exchange resin from covering the electrode catalyst and the covered area will not be reduced, so that the performance of the catalyst layer will not decrease.

The mixture preferably has a solid concentration of 1 to 20 mass %. If the solid concentration is 0.1 mass % or greater, when producing a catalyst layer by spraying or applying the mixture, a catalyst layer having a desired thickness can be obtained without having to perform the spraying or application many times, and the production efficiency is not impaired. If the solid concentration is 20 mass % or less, the resulting mixture will not be too viscous, and the resulting catalyst layer will not be nonuniform. The solid concentration is particularly preferably 1 to 10 mass %.

In the present invention, the mixture is preferably prepared such that the mass ratio of the electrode catalyst and the cation exchange resin is 50:50 to 85:15 on the solid basis. This allows the cation exchange resin to efficiently cover the electrode catalyst, so that when a membrane electrode assembly is produced, the three-phase interface can be increased. If the mass ratio (the amount of electrode catalyst) is 50:50 or greater, the pores of the carbon powder serving as a carrier will not be filled with the cation resin, and the reaction site will not be reduced. Accordingly, the performance of the polymer electrolyte fuel cell will not degrade. Further, when the mass ratio (the amount of electrode catalyst) is 85:15 or less, the electrode catalyst will be sufficiently covered by the cation exchange resin, so that the performance of the polymer electrolyte fuel cell will not degrade. The mass ratio of the electrode catalyst and the cation exchange resin is particularly preferably adjusted to 60:40 to 80:20.

In the present invention, the mixture can be prepared by means of a stirrer such as homogenizer or homomixer, by means of performing high-speed rotation using a high speed rotation jet stream or friction grinding machine, or by means of applying shear force to a dispersion by extruding the dispersion through a narrow opening with high pressure in a high-pressure emulsifier or the like.

Preferably, the obtained mixture is filtered. Filtering removes the aggregations of electrode catalyst particles present in the mixture and prevents the mixture from aggregating. For this reason, the mixture is preferably filtered before the spraying or application of the catalyst layer forming step. The filtering can be performed by forcing the mixture under pressure through a filter or by suction of the mixture through a filter. The filter preferably has a pore size of 5 to 100 µm. A pore size of 5 µm or greater is preferred because the filtering becomes easy to perform and the filter is less likely to clog. A pore size of 100 µm or less is also preferred because fine particles can be removed. Particularly preferred pore size is 20 to 60 µm.

(b) Catalyst Layer Forming Step (Membrane Electrode Assembly Forming Step)

Subsequently, a catalyst layer is formed on a support sheet using the above mixture. Specifically, a catalyst layer can be formed by spraying or applying the mixture onto a support sheet and drying a liquid film made of the mixture formed on the support sheet.

The support sheet can be (i) the above-described polymer electrolyte membrane, (ii) a gas diffusion layer comprising a porous material having gas diffusibility and electron conductivity, or (iii) a sheet or layer made of a synthetic resin insoluble in the mixture, a laminate film comprising laminated layers made of metal, a metallic sheet, a sheet made of ceramics or a sheet made of an organic-inorganic composite material.

Examples of the synthetic resin include polypropylene, polyethylene terephthalate, ethylene/tetrafluoroethylene copolymer, and polytetrafluoroethylene.

As the application method of the mixture to form a catalyst layer, the mixture can be applied by using an applicator, bar coater, die coater or spray, by screen-printing method, or by gravure printing method.

From the viewpoint of ensuring the effect of the present invention, preferably, two catalyst layers attached to the membrane electrode assembly each independently have a thickness of 3 to 50 µm. A thickness of 3 µm or greater is preferred because the gas supplied to the catalyst layer will not easily pass through the membrane and the strength of the resulting membrane electrode assembly will not be low. A thickness of 50 µm or less is also preferred because the diffusibility of supplied gas in the catalyst layer as well as the reaction will not be impaired. From the viewpoint of ensuring the effect of the present invention, preferably, two catalyst layers attached to the membrane electrode assembly each independently have a thickness of 5 to 20 µm.

The mixture may optionally contain a water repellent, a pore-forming material, a thickener, a dilution solvent and the like so as to increase the removability of water produced by electrode reaction, to retain the dimensional stability of the catalyst layer, to avoid nonuniform application during the application of the mixture, and to increase the application stability.

(c) Organic Substance Removing Step

After a laminate comprising the support sheet and the catalyst layer is obtained in a manner as described above, in the present invention, organic substance comprising at least one of the alcohol, a partial oxide of the alcohol, a product of intramolecular dehydrogenation reaction of the alcohol, a product of intermolecular condensation reaction of the alcohol, a product of intermolecular condensation reaction between the alcohol and the partial oxide, and a product of intermolecular condensation reaction of the partial oxide is removed from the catalyst layer.

As used herein, the "partial oxide of alcohol" refers to a product formed by the partial oxidation reaction of the alcohol and having an organic group in the molecule such as aldehyde group, carbonyl group or carboxyl group.

In the present invention, a rate [mass %] of the organic substance which remains in the catalyst layer is adjusted to satisfy the following equation (1) by removing the organic substance from the catalyst layer by any one of the following methods:

$$\{100 \times A_1/(E_1+G_1)\} \leq 0.05 \quad (1),$$

where $A_1$ represents a total mass of the organic substance, $E_1$ represents a total mass of the carbon powder and $G_1$ represents a total mass of the cation exchange resin. If the value of $\{100 \times A_1/(E_1+G_1)\}$ exceeds 0.05, the organic substance poisons the electrode catalyst. As a result, sufficient initial characteristics cannot be obtained from immediately after the production. Furthermore, the electrode characteristics will decrease significantly during long-term operation or storage. Whether this condition is satisfied or not can be confirmed by a gas chromatograph.

When the rate is based on the membrane electrode assembly, the rate [mass %] of the organic substance which remains in the catalyst layer preferably satisfies the following equation (2) instead of the equation (1):

$$\{100 \times A_2/(E_2+G_2)\} \leq 0.02 \quad (2),$$

where $A_2$ represents a mass of the organic substance per unit area of the membrane electrode assembly, $E_2$ represents a mass of the catalyst layer per unit area of the membrane electrode assembly and $G_2$ represents a mass of the polymer electrolyte membrane per unit area of the membrane electrode assembly. If the value of the equation (2): $\{100 \times A_2/(E_2+G_2)\}$ exceeds 0.02, the organic substance poisons the electrode catalyst. As a result, sufficient initial characteristics cannot be obtained from immediately after the production. Furthermore, the electrode characteristics will decrease significantly during long-term operation or storage.

As the method for adjusting the rate to satisfy the equation (1) or (2), the following methods are preferred. Specifically, in the catalyst layer forming step, after the catalyst layer is formed on the support sheet, a laminate comprising the support sheet and the catalyst layer is preferably heat-treated at a temperature of not less than 40° C. and not greater than the glass transition temperature of the cation exchange resin so as to remove the organic substance. This efficiently removes volatile organic substance in particular, and thus the above-described effect of the present invention can be ensured. From the viewpoint of obtaining the effect of this heat treatment, the heat treatment is preferably performed at a temperature of not less than 60° C. and not greater than the glass transition temperature of the cation exchange resin.

In the catalyst layer forming step, after the catalyst layer is formed on the support sheet, a laminate comprising the support sheet and the catalyst layer is preferably vacuum-degassed in a container so as to remove the organic substance. This allows easy removal of the organic substance from the catalyst layer, so that the above-described effect of the present invention can be ensured.

As used herein, the "vacuum" means a degree of vacuum at which the rate of the organic substance which remains in the catalyst layer can be adjusted to satisfy the equation (1) or (2) and the organic substance can be sufficiently vaporized. Accordingly, it is not limited to the academically accepted high vacuum ($1 \times 10^{-6}$ to $1 \times 10^{-6}$ Pa), and it may be so-called ultra high vacuum or extremely high vacuum. This vacuum degassing can be performed by using a vacuum pump such as oil rotary pump, ejector pump or turbo-molecular pump.

In the catalyst layer forming step, after the catalyst layer is formed on the support sheet, a laminate comprising the catalyst layer and the support sheet is preferably immersed in ion exchanged water so as to remove the organic substance. This ensures the removal of water-soluble organic substance in particular, so that the above-described effect of the present invention can be ensured. The conditions for the immersion are not specifically limited as long as the organic substance can be removed. From the viewpoint of reducing the immersion time and improving the solubility of the organic substance into ion exchanged water, the temperature of ion exchanged water is preferably adjusted to room temperature (25° C.) or higher. The immersion can be performed, for example, in a hot water bath maintained at 90° C. for 60 minutes.

From the viewpoint of minimizing the possibility that organic substance and impurities other than the organic substance enters into the catalyst layer from the outside atmosphere, and sufficiently preventing the proceeding of the partial oxidation reaction of the organic substance contained in the catalyst layer caused by an oxidizer such as air introduced into the catalyst layer from the outside atmosphere, the mixture preparation step is preferably performed in an inert gas atmosphere. From the same reason, the catalyst layer forming step (membrane electrode assembly forming step) is preferably performed in an inert gas atmosphere. Particularly, the organic substance removing step in the catalyst layer forming step (membrane electrode assembly forming step) is preferably performed in an inert gas atmosphere. Further, it is preferred to perform both mixture preparation step and catalyst forming step (membrane electrode assembly forming step) in an inert gas atmosphere. Particularly, the prevention of the proceeding of the partial oxidation reaction of the alcohol is effective for ensuring the effect of the present invention because the amount of product produced by the partial oxidation reaction of the alcohol having low volatility and high adsorption to the component materials of the catalyst layer is reduced.

As used herein, the "inert gas" comprises He, Ne, Ar, Xe, Rn or $N_2$. The "inert gas atmosphere" refers to an atmosphere composed mainly (preferably entirely) of a vapor phase containing at least one selected from the group consisting of He, Ne, Ar, Xe, Rn and $N_2$.

The inert gas atmosphere may further contain oxygen in an amount at which the partial oxidation of the alcohol that satisfies the above-described vapor pressure does not proceed. When the inert gas atmosphere contains oxygen, the upper limit value of the partial pressure of oxygen contained in the inert gas atmosphere can be set considering the solubility of oxygen in the mixture, the temperature of the mixture, the conditions for removing the organic substance {conditions for the heat treatment (temperature, time)}.

The catalyst layer obtained by the catalyst forming step described above can be suitably used to produce a gas diffusion electrode, a membrane electrode assembly, or a polymer electrolyte membrane.

In this case, if the support sheet comprises (i) a polymer electrolyte membrane, the catalyst layer is formed on each surface of the polymer electrolyte membrane, forming a membrane electrode assembly. Thereafter, the whole is sandwiched by gas diffusion layers made of carbon paper, carbon cloth, carbon felt or the like, which is then bonded by a known technique such as hot pressing.

If the support sheet comprises (ii) a gas diffusion layer, a polymer electrolyte membrane is sandwiched by two catalyst layers each having a gas diffusion layer such that the catalyst layers face the polymer electrolyte membrane, which is then bonded by a known technique such as hot pressing.

If (iii) the catalyst layer is formed on the support sheet, the support sheet having the catalyst layer is brought into contact with at least one of a polymer electrolyte membrane and a gas diffusion layer, from which the support sheet is peeled off to transfer the catalyst layer. The resultant is then bonded by a known technique.

(d) Packing and Preserving Step

Further, from the viewpoint of minimizing the possibility that organic substance enters into the catalyst layer during storage and preservation of the catalyst layer and causes the degradation of initial characteristics and durability of the polymer electrolyte fuel cell by entering into the catalyst layer during the time period from immediately after production to initial use, the method of the present invention further comprises a packing and preserving step for packing a laminate comprising the support sheet and the catalyst layer obtained after the catalyst forming process, the catalyst layer obtained by peeling off the support sheet from the laminate, or a membrane electrode assembly obtained by the membrane electrode assembly forming step into a hermetically sealed container and preserving it until initial use.

Alternatively, a unit cell, stack or a polymer electrolyte fuel cell comprising the gas diffusion electrode having the catalyst layer or the membrane electrode assembly may be packed into a hermetically sealed container, which may be preserved until initial use.

As the packing method, in order to minimize the possibility that gas enters from the outside, for example, it is preferred to use a bag or container made of a synthetic resin having excellent sealing property such as nylon or polyethylene and to incorporate a porous adsorbent such as activated carbon or silica gel thereinto.

In the gas diffusion electrode of the present invention, a membrane electrode assembly including the gas diffusion electrode and a polymer electrolyte fuel cell comprising the membrane electrode assembly, an oxidant gas containing oxygen is supplied to the cathode and a hydrogen gas containing hydrogen is supplied to the anode. To be specific, for example, separators each having a groove serving as a gas channel are disposed on the outer surfaces of the gas diffusion electrodes of the membrane electrode assembly, and the gases are passed through the gas channels, whereby the gases serving as fuel are supplied to the membrane electrode assembly and power is generated. The separators can be made of metal, carbon, a material obtained by mixing graphite and resin or the like.

EXAMPLE

The present invention will be described below in further detail with reference to examples and comparative examples, but it should be understood that the present invention is not limited these examples.

Example 1

Production of Membrane Electrode Assembly

First, carbon paper serving as a gas diffusion layer was treated for water repellency. Carbon paper (TGP-H-120 manufactured by Toray Industries, Inc.) having an outer dimension of 16 cm×20 cm and a thickness of 360 μm was immersed in an aqueous dispersion containing fluorocarbon resin (Neoflon) ND1 manufactured by Daikin Industries, Ltd.), after which the carbon paper was dried on an electric hot plate adjusted at a temperature of 60° C. for 10 to 30 minutes and then heated at 380° C. for 30 minutes so as to impart water repellency.

Onto one surface of this carbon paper was applied an ink prepared by mixing a conductive carbon powder and an aqueous solution containing PTFE fine powders dispersed therein by means of screen printing method to form a water repellent layer. The surface of the water repellent layer was partly permeated in the carbon non-woven fabric.

Then, catalyst layer-forming mixtures (inks) were prepared. A cathode catalyst (50 mass % of platinum) was prepared by allowing Ketjen Black EC (manufactured by AKZO Chemie Company of the Netherlands) having an average primary particle size of 30 nm serving as a carbon power (conductive carbon particle) to carry a platinum particle having an average particle size of 30 Å serving as an electrode catalyst.

Similarly, an anode catalyst (30 mass % of platinum, 30 mass % of ruthenium) was prepared by allowing Ketjen Black EC to carry a platinum particle and a ruthenium particle both having an average particle size of about 30 Å.

A 9 wt % polymer electrolyte solution (Flemion manufactured by Asahi Glass Co., Ltd.) prepared by dispersing a polymer electrolyte (perfluorocarbonsulfonic acid) serving as a cation exchange resin in ethanol was mixed with distilled water for preventing ignition due to catalyst and each catalyst prepared above. Thereby, an anode catalyst layer-forming mixture and a cathode catalyst layer-forming mixture were prepared.

In both mixtures, the mass ratio of polymer electrolyte to catalyst was 2:1. As the dispersing medium for the mixtures, a liquid prepared by mixing ethanol having a vapor pressure at 20° C. of 5.33 kPa with distilled water at a mass ratio of 1:1 was used. In other words, the liquid contained 50 mass % of water.

Subsequently, the cathode catalyst layer-forming mixture was applied directly onto one surface of a hydrogen ion conductive polymer electrolyte membrane (Nafion 112 manufactured by E.I. Du Pont de Nemours & Co. Inc.) having an outer dimension of 20 cm×32 cm by means of screen method, which was then dried in the air to form a cathode catalyst layer.

Meanwhile, the anode catalyst layer-forming mixture was applied onto a polypropylene support sheet by means of a coater, which was then dried to form an anode catalyst layer. The anode catalyst layer was transferred and bonded onto the other surface of the hydrogen ion conductive polymer electrolyte membrane by hot pressing (135° C., 10 minutes).

The amount of platinum contained in the formed cathode catalyst layer was adjusted to be 0.60 mg/cm$^2$. The cathode catalyst layer at this time had an average thickness of 20 μm. Likewise, the amount of platinum contained in the formed anode catalyst layer was adjusted to be 0.35 mg/cm$^2$. The anode catalyst layer at this time had an average thickness of 15 μm.

The hydrogen ion conductive polymer electrolyte membrane having the anode and cathode catalyst layers formed thereon was sandwiched by a pair of the carbon paper by means of hot pressing such that the water repellent layer of the carbon paper was in contact with the catalyst layer. Thereby, a membrane electrode assembly (MEA) having a structure as shown in FIG. 1 was obtained.

In order to remove organic substance comprising alcohol (i.e., ethanol) and its partial oxide remaining in the catalyst layers of the membrane electrode assembly, the membrane electrode assembly was heat-treated at 85° C. in the air for 60 minutes. The conditions for this heat treatment were previously determined through experiments to satisfy the equation (2).

A center portion of the heat-treated membrane electrode assembly (ten membrane electrode assemblies were produced, and five out of ten were used for characteristic test and the remaining five was used for analysis) was punched into a prismatic piece (test piece, bottom size: 3 mm×3 mm, 1.7 mg). Then, the amount of organic substance remaining in the catalyst layers was measured by gas chromatography and determined using the equation (2): $\{100 \times A_2/(E_2+G_2)\}$, and found to be 0.013% (arithmetic average value). The gas chromatograph used here was JEOL JMS-AM II 120 (trade name). The column used for the gas chromatography was HP-InnoWAX (trade name, length: 30 m, I.D.: 0.25 mm, Film: 0.25 μm). The carrier gas used was He (100 kPa). Subsequently, rubber gasket plates were attached to the peripheries of the polymer electrolyte membrane of the produced membrane electrode assembly, and manifold apertures for cooling water, fuel gas and oxidant gas were formed.

Production of Polymer Electrolyte Fuel Cell

Separators were obtained by forming a gas channel and a cooling water channel each having a depth of 1 mm in a plate made of electron conductive carbon material having an outer dimension of 20 cm×32 cm and a thickness of 3.0 mm. A thin portion of the separators had a thickness of 0.3 mm.

Using the separators produced as above, a unit cell was produced by placing one separator having an oxidant gas channel on one surface of the membrane electrode assembly and another separator having a fuel gas channel onto the other surface.

A stack 21 was produced by stacking 100 unit cells such that the surface of the separator having a cooling water channel formed thereof was in contact with one surface of the unit cell. Then, current collector plates made of stainless steel, insulating plates made of an electrically insulating material (not shown), and end plates 22 were placed onto both ends of the stack 21. The whole was fixed by clamping rods 23, and thus a polymer electrolyte fuel cell of the present invention having a structure as shown in FIG. 2 was obtained. The clamping rods 23 were fixed by spring screws 24. The clamping pressure was 7 kgf/cm² per separator area.

Preservation of Polymer Electrolyte Fuel Cell

A nitrogen gas in an amount of 1000 cc/min was supplied to each of anode-side and cathode-side supply gas inlets 25 of the polymer electrolyte fuel cell produced above for 30 minutes so as to remove the oxygen existed in the stack and replace it with the nitrogen gas. The reference numerals 26 and 26a indicate a cooling water inlet and a cooling water outlet, respectively.

Thereafter, in order to adsorb and remove organic substance comprising alcohol which still remained in the membrane electrode assembly due to insufficient removal during the production of the membrane electrode assembly, a cartridge 27 comprising an activated carbon (crushed coconut shell activated carbon manufactured by Cataler Corporation) was disposed (see FIG. 1). Note that when a cartridge comprising a silica gel (crushed silica gel manufactured by Fuji Silysia Chemical Ltd.) was disposed for the purpose of removing the organic substance remaining in the catalyst layer, a similar effect was obtained.

Evaluation of Polymer Electrolyte Fuel Cell

The polymer electrolyte fuel cell of the present invention was packed as described above and stored at room temperature (25° C.) for 5000 hours. Thereafter, the fuel cell was kept at a temperature of 70° C. and subjected to a discharge test under conditions of a fuel utilization rate of 80%, oxygen utilization rate of 40% and a current density of 300 mA/cm² by supplying a hydrogen gas having humidified and heated to have a dew point of 65° C. to the anode and air having humidified and heated to have a dew point of 70° C. to the cathode.

Figure 3:
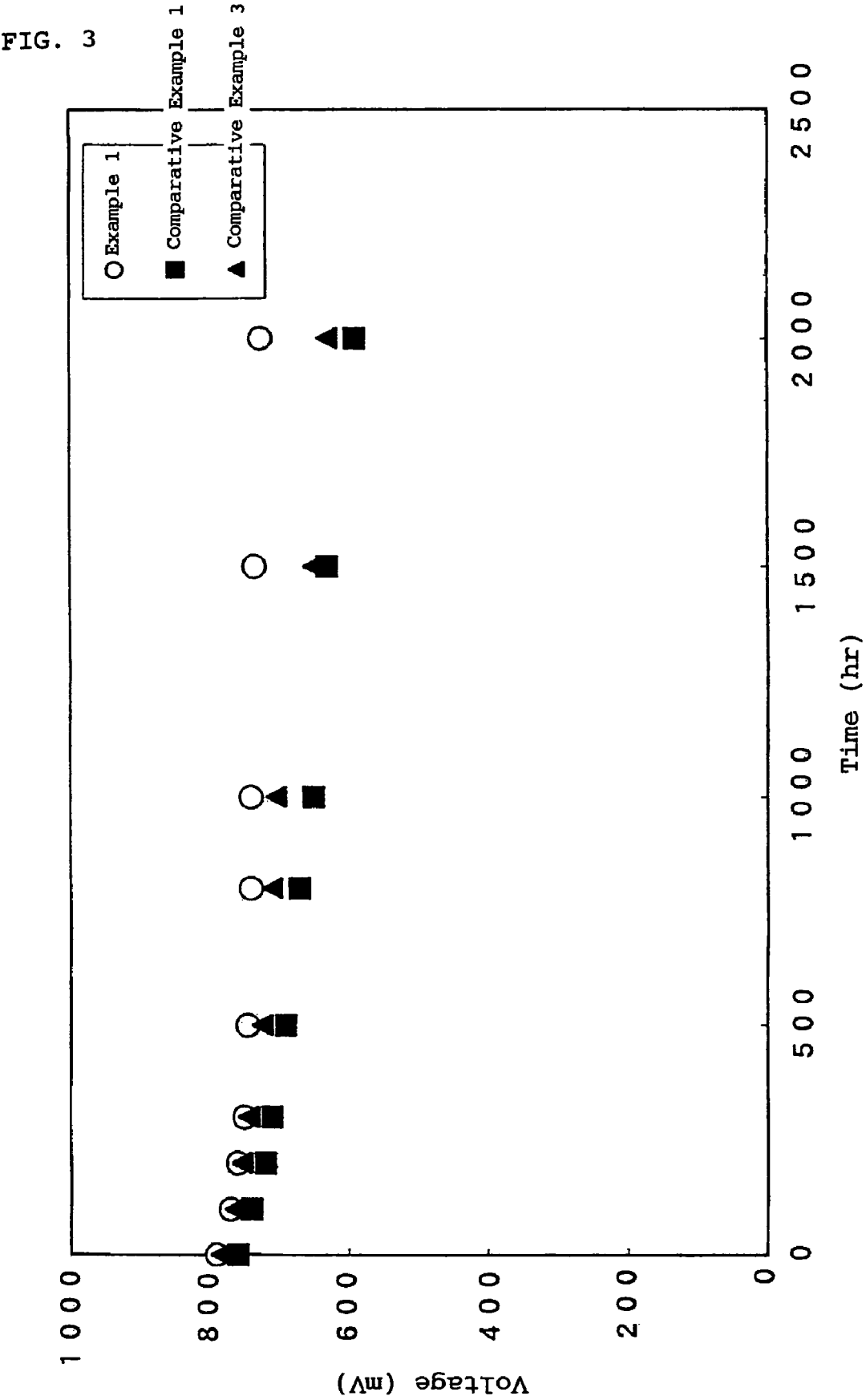
FIG. 3 is a graph showing a change in average voltage with time of a single unit cell contained in polymer electrolyte fuel cells produced in Example 1 of the present invention and Comparative Examples 1 and 3.

For comparison, a produced polymer electrolyte fuel cell (before the packing) was also subjected to the discharge test. FIG. 3 shows a change in average voltage with time of a single unit cell contained in the polymer electrolyte fuel cells.

Example 2

Gas diffusion electrodes and a membrane electrode assembly were produced in the same manner as in Example 1. The membrane electrode assembly was heat-treated at 85° C. in a nitrogen atmosphere for 60 minutes so as to remove organic substance comprising alcohol remaining in the catalyst layers of the membrane electrode assembly. The conditions for this heat treatment were previously determined through experiments to satisfy the equation (2).

A center portion of the heat-treated membrane electrode assembly (ten membrane electrode assemblies were produced, and five out of ten were used for characteristic test and the remaining five was used for analysis) was punched into a prismatic piece (test piece, bottom size: 3 mm×3 mm, 1.7 mg). Then, the amount of organic substance remaining in the catalyst layers was measured by gas chromatography (using the same equipment and measurement conditions as in Example 1) and determined using the equation (2): $\{100 \times A_2/(E_2+G_2)\}$, and found to be 0.013%.

Figure 4:
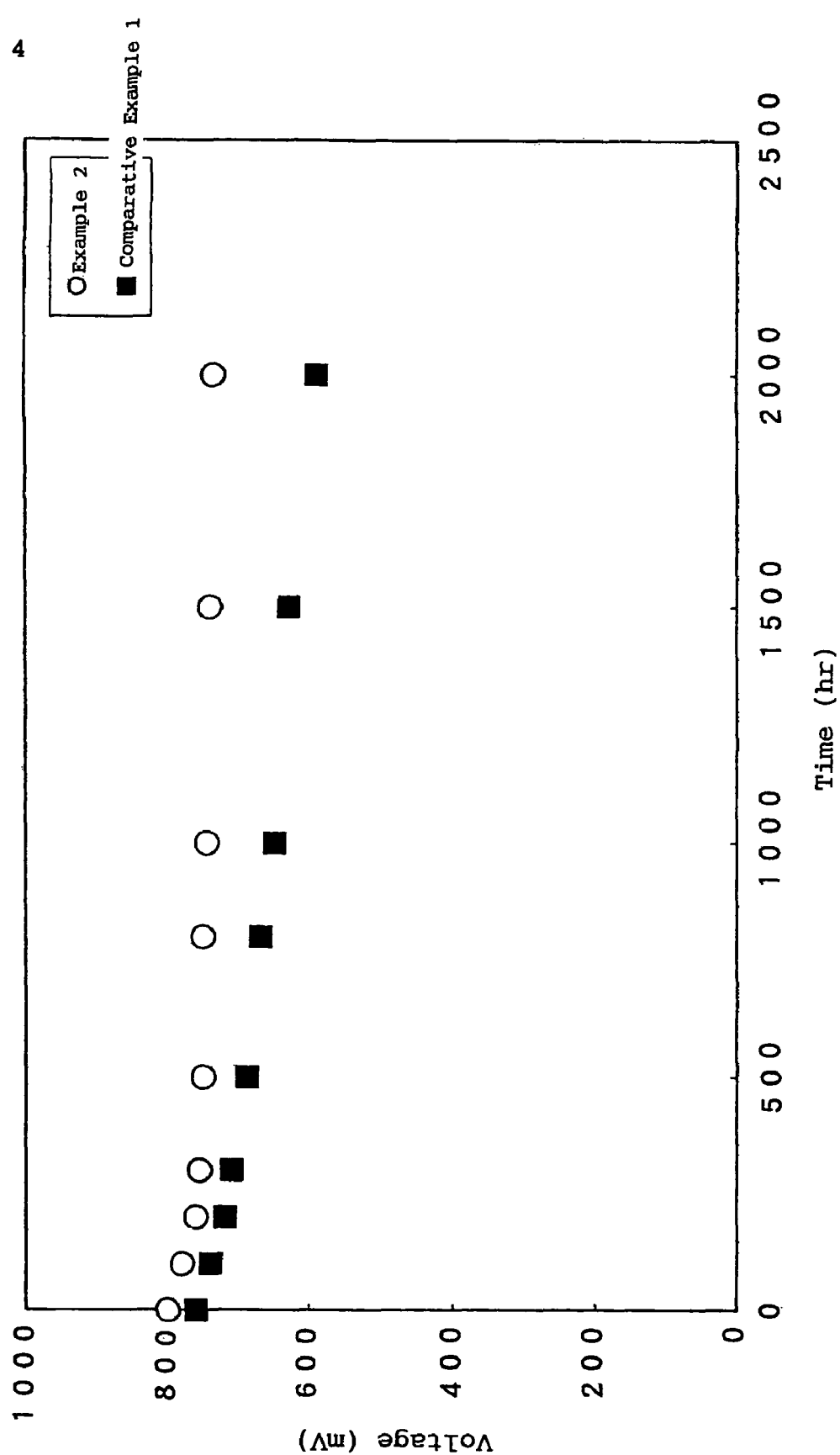
FIG. 4 is a graph showing a change in average voltage with time of a single unit cell contained in polymer electrolyte fuel cells produced in Example 2 of the present invention and Comparative Example 1.

Using the produced membrane electrode assembly, a polymer electrolyte fuel cell was produced in the same manner as in Example 1. The polymer electrolyte fuel cell was stored at room temperature (25° C.) for 5000 hours and then subjected to the discharge test. A change in average voltage of a single unit cell with time for this polymer electrolyte fuel cell is shown in FIG. 4.

Example 3

Gas diffusion electrodes and a membrane electrode assembly were produced in the same manner as in Example 1. The membrane electrode assembly was immersed in ion exchanged water at 80° C. for 60 minutes so as to remove organic substance comprising alcohol remaining in the catalyst layers of the membrane electrode assembly. The conditions for this heat treatment were previously determined through experiments to satisfy the equation (2).

A center portion of the heat-treated membrane electrode assembly (ten membrane electrode assemblies were produced, and five out of ten were used for characteristic test and the remaining five was used for analysis) was punched into a prismatic piece (test piece, bottom size: 3 mm×3 mm, 1.7 mg). Then, the amount of organic substance remaining in the catalyst layers was measured by gas chromatography (using the same equipment and measurement conditions as in Example 1) and determined using the equation (2): $\{100 \times A_2/(E_2+G_2)\}$, and found to be 0.002%.

Figure 5:
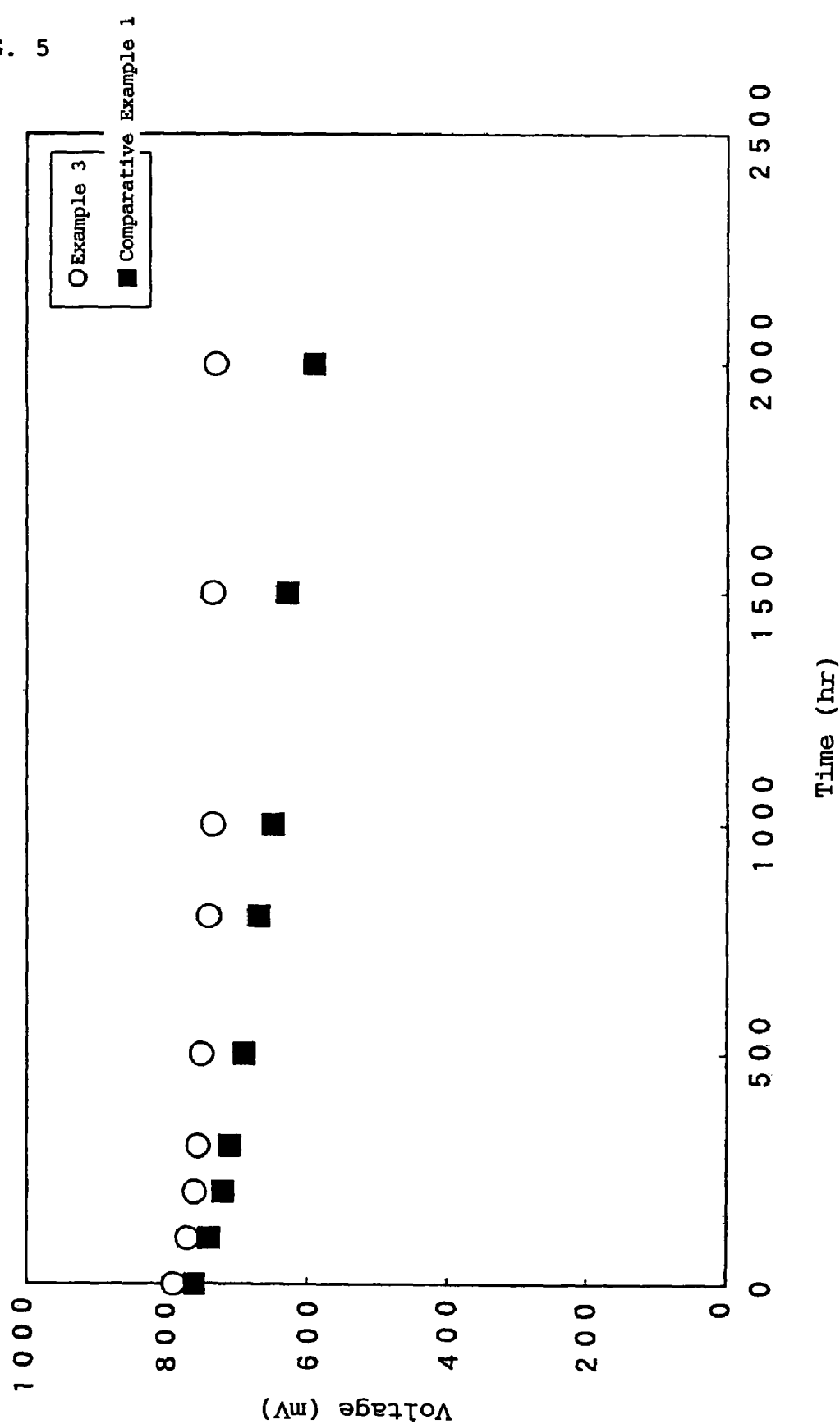
FIG. 5 is a graph showing a change in average voltage with time of a single unit cell contained in polymer electrolyte fuel cells produced in Example 3 of the present invention and Comparative Example 1.

Using the produced membrane electrode assembly, a polymer electrolyte fuel cell was produced in the same manner as in Example 1. The polymer electrolyte fuel cell was stored at room temperature (25° C.) for 5000 hours and then subjected to the discharge test. A change in average voltage with time of a single unit cell contained in this polymer electrolyte fuel cell is shown in FIG. 5.

Comparative Example 1

Gas diffusion electrodes, a membrane electrode assembly and a polymer electrolyte were produced in the same manner as in Example 1 except that the step of removing organic substance comprising alcohol which remained in the catalyst layers was not preformed. The obtained polymer electrolyte fuel cell was stored at room temperature (25° C.) in the air for 5000 hours without supplying of a nitrogen gas from the anode-side and cathode-side supply gas inlets. Thereafter, the polymer electrolyte fuel cell was subjected to the discharge test. A change in average voltage with time of a single unit cell contained in this polymer electrolyte fuel cell is shown in FIG. 3.

A center portion of the heat-treated membrane electrode assembly (ten membrane electrode assemblies were produced, and five out of ten were used for characteristic test and the remaining five was used for analysis) was punched into a prismatic piece (test piece, bottom size: 3 mm×3 mm, 1.7 mg). Then, the amount of organic substance remaining in the catalyst layers was measured by gas chromatography (using the same equipment and measurement conditions as in Example 1) and determined using the equation (2): $\{100 \times A_2/(E_2+G_2)\}$, and found to be 0.04%.

Comparative Example 2

Gas diffusion electrodes, a membrane electrode assembly and a polymer electrolyte fuel cell were produced in the same manner as in Example 1. The obtained polymer electrolyte fuel cell was stored at room temperature (25° C.) in the air for 5000 hours without the packing method according to the present invention. Thereafter, the polymer electrolyte fuel cell was subjected to the discharge test. A change in average voltage with time of a single unit cell contained in this polymer electrolyte fuel cell is shown in FIG. 3.

INDUSTRIAL APPLICABILITY

The gas diffusion electrode obtained according to the production method of the present invention and the polymer electrolyte fuel cell using the gas diffusion electrode have excellent initial characteristics, and the degradation of initial chrematistics and durability is small even when used for a long period of time. Accordingly, they are suitable for use in portable power sources, power sources for portable devices and electric vehicles, and home cogeneration systems.

The invention claimed is:

1. A method for producing a gas diffusion electrode comprising at least a catalyst layer including a carbon powder carrying an electrode catalyst and a cation exchange resin, said method comprising:
    a mixture preparation step for preparing a catalyst layer-forming mixture containing said carbon powder carrying an electrode catalyst, said cation exchange resin, and a liquid containing an alcohol capable of dissolving or dispersing said cation exchange resin and having a vapor pressure at 20° C. of 0.6 to 12.3 kPa; and
    a catalyst layer forming step for forming said catalyst layer on a support sheet using said mixture, wherein:
    in said catalyst layer forming step, organic substance comprising at least one of said alcohol, a partial oxide of said alcohol, a product of intramolecular dehydrogenation reaction of said alcohol, a product of intermolecular condensation reaction of said alcohol, a product of intermolecular condensation reaction between said alcohol and said partial oxide, and a product of intermolecular condensation reaction of said partial oxide is removed, whereby a rate [mass %] of said organic substance which remains in said catalyst layer is adjusted to satisfy the following equation (1):

$$\{100 \times A_1/(E_1+G_1)\} \leq 50.05 \quad (1),$$

where $A_1$ represents a total mass of said organic substance, $E_1$ represents a total mass of said carbon powder and $G_1$ represents a total mass of said cation exchange resin, and
    said method further comprises a packing and preserving step for packing a laminate comprising said support sheet and said catalyst layer obtained in said catalyst forming step or said catalyst layer obtained by peeling off said support sheet from said laminate into a hermetically sealed container and preserving it until initial use.

2. The method for producing a gas diffusion electrode in accordance with claim 1,
    wherein said laminate comprising said support sheet and said catalyst layer obtained by forming said catalyst layer on said support sheet in said catalyst layer forming step is heat-treated at a temperature of not less than 40° C. and not more than a glass transition temperature of said cation exchange resin so as to remove said organic substance.

3. The method for producing a gas diffusion electrode in accordance with claim 1,
    wherein said catalyst layer forming step is performed in an inert gas atmosphere.

4. The method for producing a gas diffusion electrode in accordance with claim 1,
    wherein said mixture preparation step is performed in an inert gas atmosphere.

5. The method for producing a gas diffusion electrode in accordance with claim 1,
    wherein said laminate comprising said support sheet and said catalyst layer obtained by forming said catalyst layer on said support sheet in said catalyst layer forming step is vacuum-degassed in a container.

6. The method for producing a gas diffusion electrode in accordance with claim 1,
    wherein said laminate comprising said support sheet and said catalyst layer obtained by forming said catalyst layer on said support sheet in said catalyst layer forming step is immersed in ion exchanged water.

7. The method for producing a gas diffusion electrode in accordance with claim 1,
    wherein in said mixture preparation step, a liquid containing 50 mass % or more of water is used as said liquid.

8. The method for producing a gas diffusion electrode in accordance with claim 1,
    wherein in said catalyst layer forming step, said mixture is sprayed or applied onto said support sheet, followed by drying to form said catalyst layer on said support sheet.

9. The method for producing a gas diffusion electrode in accordance with claim 1,
    wherein said support sheet comprises a polymer electrolyte membrane.

10. The method for producing a gas diffusion electrode in accordance with claim 1,
    wherein said support sheet comprises a gas diffusion layer comprising a porous material having gas diffusibility and electron conductivity.

11. The method for producing a gas diffusion electrode in accordance with claim 1,
    wherein:
    said support sheet comprises any one of a sheet made of a synthetic resin insoluble in said catalyst layer-forming mixture, a sheet made of ceramics, a sheet made of a composite material of an organic material and an inorganic material and a sheet made of a metal, and after said catalyst layer is formed on said support sheet, said catalyst layer is transferred onto at least one of said polymer electrolyte membrane and said gas diffusion layer comprising a porous material having gas diffusibility and electron conductivity.

* * * * *